United States Patent
Lacroix et al.

(10) Patent No.: US 6,913,804 B2
(45) Date of Patent: Jul. 5, 2005

(54) ANTISTATIC POLYMER COMPOSITIONS

(75) Inventors: Christophe Lacroix, Harquency (FR); Reinhard Linemann, Bernay (FR); Philippe Blondel, Bernay (FR); Yves Lermat, Bernay (FR)

(73) Assignee: Arkema, Paris la Defense Cedex (FR)

( * ) Notice: Subject to any disclaimer, the term of this patent is extended or adjusted under 35 U.S.C. 154(b) by 0 days.

(21) Appl. No.: 10/137,734

(22) Filed: May 3, 2002

(65) Prior Publication Data

US 2003/0065107 A1 Apr. 3, 2003

(30) Foreign Application Priority Data

May 3, 2001 (FR) .............................. 01 05914

(51) Int. Cl.$^7$ .................. B29D 22/00; B29D 23/00; C08L 77/12
(52) U.S. Cl. .................. 428/35.7; 525/60; 525/89; 525/92 A; 525/420; 525/424; 525/425; 525/432; 525/434
(58) Field of Search .................. 525/60, 89, 92 A, 525/420, 424, 425, 432, 434; 428/35.7

(56) References Cited

U.S. PATENT DOCUMENTS 6,001,930 A * 12/1999 Rajagopalan ............. 525/92 B
6,207,784 B1 * 3/2001 Rajagopalan ................ 528/71
6,706,851 B1 * 3/2004 Linemann et al. .......... 528/271

FOREIGN PATENT DOCUMENTS

JP           44-22535 * 9/1969

OTHER PUBLICATIONS

Derwent–Acc No. 1968–37457Q.*
Patent Abstracts of Japan, vol. 1998, No. 06, 30 avril 1998 (Apr. 30,1998), & JP 10 036628 A (Kanegafuchi Chem Ind Co Ltd), 10 fevrier 1998 (Feb. 10, 1998).
Patent Abstracts of Japan, vol. 1996, No. 06, 28 juin 1996 (Jun. 28, 1996) & JP 08 048823 A (Sanyo Chem Ind Ltd), 20 ferrier 1996 (Feb. 20, 1996).
Patent Abstracts of Japan, vol. 017, No. 689 (C–1143), 16 decembre 1993 (Dec. 16, 1993) & JP 05 230301 A (Toray Ind Inc), 7 septembre 1993 (Sep. 7, 1993).
Patent Abstracts of Japan, vol. 1997, No. 05, 30 mai 1997 (May 30, 1997) & JP 09 003339 A (Calp Corp; AMEX;KK), 7 janvier 1997 (Jan. 7, 1997).
Patent Abstracts of Japan, vol. 009, No. 052 (C–269), 6 mars 1985 (Mar. 6, 1985) & JP 59 191752 A (Mitsubishi Gas Kagaku KK), 30 octobre 1984 (Oct. 30 1984).
DATABASE WPI, Section CH, Week 199223, Derwent Publications Ltd., London, GB; AN 1992–187555, XP002184409 & JP 04 114061 A (Asahi Chem Ind Co Ltd), 15 avril 1992 (Apr. 15, 1992).

* cited by examiner

*Primary Examiner*—Ana Woodward
(74) *Attorney, Agent, or Firm*—Millen, White, Zelano, Branigan, P.C.

(57) ABSTRACT

The present invention relates to a composition comprising, per 100 parts by weight:
99 to 60 parts of a thermoplastic polymer (D),
1 to 40 parts of (A)+(B)=(C)
(A) being a copolymer comprising polyamide blocks and polyether blocks,
(B) being a polymer or an oligomer which comprises, in its chain, at least one ionic functional group and is chosen from:
    polyamides,
    copolymers comprising polyamide blocks and polyether blocks,
    thermoplastic polyesters or polyesteramides,
    copolymers comprising polyester blocks and polyether blocks,
    polyethers,
    polyurethanes.
The invention also relates to the blends of (A) and (B) as product.

36 Claims, No Drawings

ANTISTATIC POLYMER COMPOSITIONS

The present invention relates to an antistatic polymer composition and more specifically to a composition comprising a thermoplastic polymer (D) and a blend composed of a copolymer (A) comprising polyamide blocks and polyether blocks and a polymer or an oligomer (B) comprising, in its chain, at least one ionic functional group. It is a matter of giving the thermoplastic polymer permanent antistatic properties. Furthermore, this is an improvement with respect to the simple addition of salts of low mass or with respect to known antistatic agents. The formation and the retention of static electricity charges at the surface of most plastics are known. The presence of static electricity on thermoplastic films results, for example, in these films becoming stuck together, making it difficult to separate them. The presence of static electricity on packaging films can lead to the accumulation of dust on the items to be packaged and thus can be harmful to their use. Static electricity can also damage microprocessors or constituents of electronic circuits. Static electricity can also result in the combustion or explosion of inflammable materials, such as, for example, expandable polystyrene beads, which comprise pentane.

The prior art has disclosed antistatic agents, such as ionic surfactants of the ethoxylated amine or sulphonate type, which are added to polymers. However, the antistatic properties of the polymers depend on the ambient humidity and they are not permanent, since these agents migrate to the surface of the polymer and disappear. Polymers or oligomers were then provided as antistatic agents. These agents have the advantage of not migrating and therefore of giving permanent antistatic properties which are, furthermore, independent of the ambient humidity. The compositions of the invention are of this type.

Japanese Patent Application JP 60 170 646 A, published on 4 Sep. 1985, discloses compositions composed of 0.01 to 50 parts of polyether-block-amide and of 99.99 to 50 parts of polystyrene. They are of use in manufacturing slip components and components which are resistant to wear. The antistatic properties are not mentioned.

Patent Application EP 167 824, published on 15 Jan. 1986, discloses similar compositions to the preceding ones and, according to one form of the invention, the polystyrene can be blended with a polystyrene functionalized by unsaturated carboxylic anhydride. These compositions are of use in manufacturing injected components. The antistatic property is not mentioned.

Japanese Patent Application JP 60 023 435 A, published on 6 Feb. 1985, discloses antistatic compositions comprising 5 to 80% of polyetheresteramide and 95 to 20% of a thermoplastic resin chosen, inter alia, from polystyrene, ABS and PMMA, this resin being functionalized by acrylic acid or maleic anhydride. The amount of polyetheresteramide in the examples is 30% by weight of the compositions.

Patent EP 242 158 discloses antistatic compositions comprising 1 to 40% by weight of polyetheresteramide and 99 to 60% of a thermoplastic resin chosen from styrene resins, PPO and polycarbonate. According to a preferred form, the compositions also comprise a vinyl polymer functionalized by a carboxylic acid which can, for example, be a polystyrene modified by methacrylic acid.

Patent Application WO 0110951 discloses a composition comprising, per 100 parts by weight:
99 to 60 parts of a styrene polymer,
1 to 40 parts of a blend of two polymers,
one being a copolymer comprising polymer blocks and polyether blocks essentially comprising ethylene oxide units —$(C_2H_4$—O)—,
the other being a compatibilizing agent chosen from copolymers of low mass of styrene and of an unsaturated carboxylic acid anhydride, copolymers of ethylene and of an unsaturated carboxylic acid anhydride, copolymers of ethylene and of an unsaturated epoxide, SBS or SIS block copolymers grafted by an unsaturated carboxylic acid or an unsaturated carboxylic acid anhydride, and their blends,
the ratio by weight of the copolymer comprising polyamide blocks and polyether blocks with a compatibilizing agent being between 2 and 10.

Patent EP 829 520 discloses substrates, such as PVC, HDPE, LLDPE, polypropylene, ABS and polystyrene, which are rendered antistatic by adding thereto an antistatic blend composed of a copolymer comprising polyamide blocks and polyether blocks, of a salt, such as sodium perchlorate, and of a fibrous material or a material which forms fibres during the introduction of the blend into the substrate. The proportion of the antistatic blend by weight is from 0.1 to 15% and preferably 1 to 15% of the substrate. The proportion by weight of the salt is 0.05 to 10% and preferably 0.5 to 5% of the amount of copolymer comprising polyamide blocks and polyether blocks. The ratio of the amount of fibres to the amount of copolymer comprising polyamide blocks and polyether blocks is, by weight, from 20/1 to 1/10 and preferably 10/1 to 1/3. In Example 19, 3.84 g of copolymer comprising polyamide blocks and polyether blocks, 0.16 g of sodium perchlorate and 4 g of PA-6 fibres are added to 191.8 g of polystyrene. This corresponds to approximately 4% of antistatic blend in 96% of polystyrene, the fibres representing half the blend. In Example 20, 4.8 g of copolymer comprising polyamide blocks and polyether blocks, 0.2 g of sodium perchlorate and 5 g of PA-6 fibres are added to 189 g of polystyrene. This corresponds to approximately 5% of antistatic blend in 95% of polystyrene, the fibres representing half of the blend. In both these examples, the surface resistivities are of the order of $10^{11}$ ohms/□.

Much more effective antistatic compositions have now been found, that is to say that, instead of adding a copolymer (A) comprising polyamide blocks and polyether blocks and optionally salts and fibres to a thermoplastic polymer (D), a copolymer (A) comprising polyamide blocks and polyether blocks and a polymer or an oligomer (B) comprising, in its chain, at least one ionic functional group are added thereto.

The prior art has disclosed polymers or oligomers (B) comprising a sulphonate functional group as ionic functional group but not in combination with a copolymer comprising polyamide blocks and polyether blocks in a thermoplastic polymer (D) for rendering it antistatic.

Patent U.S. Pat. No. 3,296,204 discloses linear polyamide fibres obtained by the reaction of 5-sulphoisophthalic acid with a diamine, followed by polycondensation with an amino acid or a salt of diamine and of diacid, such as hexamethylene adipate. These fibres are very suitable for dyeing and absorb moisture like natural fibres.

Patent Application JP 11 029 685 A, published on Feb. 2, 1999, discloses antistatic acrylic resins comprising polyetheresters obtained by condensation of polyalkylene glycol and of dicarboxylic acids. A portion of these diacids comprises sulphonic groups.

Patent Application JP 08 208 830 A, published on Aug. 13, 1996, discloses hydrophilic elastomers comprising salts of 5-sulphoisophthalic acid (SIPNa denoting the sodium salt of sulphoisophthalic acid) and adducts of ethylene oxide with an aromatic diol.

Patent U.S. Pat. No. 5,096,995 discloses polyetheresteramides having two polyether blocks, namely polyether blocks of poly(ethylene glycol) type and blocks which are added to ethylene oxide with an aromatic diol. The chain-limiting agent of the polyamide blocks is a dicarboxylic acid. Mention is made of diesters carrying a sulphonate group, such as the sodium salt of sulphoisophthalic acid, and unsubstituted diacids but it is preferable to use unsubstituted acids, such as terephthalic acid, isophthalic acid, 1,4-cyclohexanedicarboxylic acid, sebacic acid, adipic acid and decanedicarboxylic acid. None of the examples uses diacids carrying sulphonate groups.

Patent Application JP 05 140 541 A, published on 8 Jun. 1993, discloses polyetheresteramides having polyamide blocks formed by the condensation of caprolactam in the presence of sodium salt of 3-sulphoisophthalic acid and polyether blocks which are adducts of ethylene oxide with bisphenol A.

Patent EP 613 919 discloses polyetheresteramides having polyether blocks which are adducts of ethylene oxide with bisphenol A. The chain-limiting agent of the polyamide blocks is a dicarboxylic acid. Mention is made of diacids carrying a sulphonate group, such as the sodium salt of 3-sulphoisophthalic acid, and unsubstituted diacids, such as terephthalic acid, isophthalic acid, sebacid acid, adipic acid and decanedicarboxylic acid. None of the examples uses diacids carrying sulphonate groups. Furthermore, the specific advantage introduced by the incorporation of ionic groups, such as sulphonate groups, in the polyetheresteramide chain for improving the antistatic properties is not disclosed. As shown in this patent, the use of a bisphenol A adduct plays a thermal stabilization role. On the other hand, the intrinsic antistatic properties of the product are not improved. The polyamide blocks described in the examples are composed of caprolactam. These polyetheresteramides are added to various thermoplastic polymers to render them antistatic but it is necessary also to add salts chosen from alkali metal or alkaline earth metal halides.

Patent Application WO 0017262, "Salt modified electrostatic dissipative polymers", discloses polyether oligomers mainly comprising lithium salts. SIPNa is neither claimed nor given as an example. The salt is introduced during the polymerization.

The present invention relates to a composition comprising, per 100 parts by weight:
99 to 60 parts of a thermoplastic polymer (D),
1 to 40 parts of (A)+(B)=(C)
(A) being a copolymer comprising polyamide blocks and polyether blocks,
(B) being a polymer or an oligomer which comprises, in its chain, at least one ionic functional group and is chosen from:
polyamides,
copolymers comprising polyamide blocks and polyether blocks,
thermoplastic polyesters or polyesteramides,
copolymers comprising polyester blocks and polyether blocks,
polyethers,
polyurethanes.
The invention also relates to the blends (A) and (B) as product.

Mention may be made, as examples of thermoplastic polymers (D), of polyolefins, polyamides, fluoropolymers, saturated polyesters, polycarbonate, styrene resins, PMMA, thermoplastic polyurethanes (TPU), copolymers comprising polyamide blocks, copolymers comprising polyester blocks and polyether blocks, PVC, copolymers of ethylene and of vinyl alcohol (EVOH) and polyketones.

The copolymers (A) comprising polyamide blocks and polyether blocks result from the copolycondensation of polyamide sequences comprising reactive ends with polyether sequences comprising reactive ends, such as, inter alia,:
1) Polyamide sequences comprising diamine chain ends with polyoxyalkylene sequences comprising dicarboxyl chain ends,
2) Polyamide sequences comprising dicarboxyl chain ends with polyoxyalkylene sequences comprising diamine chain ends obtained by cyanoethylation and hydrogenation of aliphatic α,ω-dihydroxylated polyoxyalkylene sequences, known as polyetherdiols,
3) Polyamide sequences comprising dicarboxyl chain ends with polyetherdiols, the products obtained being, in this specific case, polyetheresteramides. The copolymers of the invention are advantageously of this type.

The polyamide sequences comprising dicarboxyl chain ends originate, for example, from the condensation of polyamide precursors in the presence of a chain-limiting dicarboxylic acid.

The polyamide sequences comprising diamine chain ends originate, for example, from the condensation of polyamide precursors in the presence of a chain-limiting diamine.

The polymers comprising polyamide blocks and polyether blocks can also comprise randomly distributed units. These polymers can be prepared by the simultaneous reaction of the polyether and of the precursors of the polyamide blocks.

For example, polyetherdiol, polyamide precursors and a chain-limiting diacid can be reacted. A polymer is obtained which has essentially polyether blocks, polyamide blocks of highly variable length but also the various reactants which have reacted randomly, which are distributed randomly (statistically) along the polymer chain.

Polyetherdiamine, polyamide precursors and a chain-limiting diacid can also be reacted. A polymer is obtained which has essentially polyether blocks, polyamide blocks of highly variable length but also the various reactants which have reacted randomly, which are distributed randomly (statistically) along the polymer chain.

Three types of polyamide blocks can advantageously be used. According to a first type, the polyamide sequences originate, for example, from the condensation of α,ω-aminocarboxylic acids, of lactams or of dicarboxylic acids and diamines.

According to a second type, the polyamide sequences result from the condensation of one or more α,ω-aminocarboxylic acids and/or of one or more lactams having from 6 to 12 carbon atoms in the presence of a dicarboxylic acid having from 4 to 12 carbon atoms or of a diamine and are of low mass, that is to say of $\overline{Mn}$ 400 to 800.

According to a third type, the polyamide sequences result from the condensation of at least one α,ω-aminocarboxylic acid (or one lactam), at least one diamine and at least one dicarboxylic acid. According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms, in the optional presence of a chain-limiting agent.

Advantageously, the polyamide blocks of the first type are of polyamide-12 or of polyamide-6.

In the second and third types, the various constituents of the polyamide sequence and their proportions are chosen in order to obtain a melting temperature of less than 150° C.

and advantageously of between 90 and 135° C. Copolyamides with low melting temperatures are disclosed in Patents U.S. Pat. No. 4,483,975, DE 3 730 504 and U.S. Pat. No. 5,459,230. The same proportions of the constituents can be used for the polyamide blocks.

Examples of polyamide sequences of the second type are those obtained by condensation of lauryllactam in the presence of adipic acid, of sebacic acid or of dodecanedioic acid and with a mass $\overline{Mn}$ of 750 which have a melting temperature of 127–130° C.

Mention may be made, as examples of polyamide sequences of the third type, of the following:

6.6/Pip.10/12     a)

in which 6.6 denotes hexamethyleneadipamide units (hexamethylenediamine condensed with adipic acid).

Pip.10 denotes units resulting from the condensation of piperazine and of sebacic acid.

12 denotes units resulting from the condensation of lauryllactam.

The proportions by weight are respectively
25 to 35/20 to 30/20 to 30, the total being 80, and advantageously 30 to 35/22 to 27/22 to 27, the total being 80.

For example, the proportions 32/24/24 result in a melting temperature of 122 to 137° C.

6.6/6.10/11/12     b)

in which 6.6 denotes hexamethylenediamine condensed with adipic acid 6.10 denotes hexamethylenediamine condensed with sebacic acid 11 denotes units resulting from the condensation of aminoundecanoic acid 12 denotes units resulting from the condensation of lauryllactam.

The proportions by weight are respectively
10 to 20/15 to 25/10 to 20/15 to 25, the total being 70, and advantageously:

12 to 16/18 to 25/12 to 16/18 to 25, the total being 70.

For example, the proportions 14/21/14/21 result in a melting temperature of 119 to 131° C.

The polyamide blocks are obtained in the presence of a chain-limiting diacid or diamine, if polyamide blocks comprising acid or amine ends are desired. If the precursors already comprise a diacid or a diamine, it is sufficient, for example, to use it in excess.

Mention may be made, as examples of aliphatic α,ω-aminocarboxylic acids, of aminocaproic acid, 7-aminoheptanoic acid, 11-aminoundecanoic acid and 12-aminododecanoic acid.

Mention may be made, as examples of lactams, of caprolactom, oenantholactam and lauryllactam.

Mention may be made, as examples of aliphatic diamines, of hexamethylenediamine, dodecamethylenediamine and trimethylhexamethylene-diamine.

Mention may be made, as examples of cycloaliphatic diacids, of 1,4-cyclohexanedicarboxylic acid.

Mention may be made, as examples of aliphatic diacids, of butanedioic acid, adipic acid, azeleic acid, suberic acid, sebacic acid, dodecanedicarboxylic acid, dimerized fatty acids (these dimerized fatty acids preferably have a dimer content of at least 98%; they are preferably hydrogenated; they are sold under the "Pripol" trademark by "Unichema" or under the Empol trademark by Henkel) and polyoxyalkylene-α,ω-diacids.

Mention may be made, as examples of aromatic diacids of terephthalic acid (T) and isophthalic acid (I).

The cycloaliphatic diamines can be isomers of bis(4-aminocyclohexyl)methane (BACM), bis(3-methyl-4-aminocyclohexyl)-methane (BMACM), 2,2-bis(3-methyl-4-aminocyclohexyl)propane (BMACP) and para-amino-dicyclohexylmethane (PACM). The other diamines commonly used can be isophoronediamine (IPDA), 2,6-bis (aminomethyl)norbornane (BAMN) and piperazine.

The polyether blocks can represent 5 to 85% by weight of the copolymer comprising polyamide and polyether blocks. The polyether blocks are composed of alkylene oxide units. These units can, for example, be ethylene oxide units, propylene oxide units or tetrahydrofuran units (which results in polytetramethylene glycol links). PEG blocks, that is to say those composed of ethylene oxide units, PPG blocks, that is to say those composed of propylene oxide units, and PTMG blocks, that is to say those composed of tetramethylene glycol units, also known as polytetrahydrofuran blocks, are thus used. PEG blocks or blocks obtained by oxyethylation of bisphenols, such as, for example, bisphenol A, are advantageously used. The latter products have been disclosed in Patent EP 613 919.

The polyether blocks can also be composed of ethoxylated primary amines. These blocks also are advantageously used. Mention may be made, as examples of ethoxylated primary amines, of the products of formula:

$$H-(OCH_2CH_2)_{\overline{m}}-N-(CH_2CH_2O)_{\overline{n}}-H$$
$$|$$
$$(CH_2)_x$$
$$|$$
$$CH_3$$

in which m and n are between 1 and 20 and x between 8 and 18. These products are commercially available under the Noramox® trademark from Ceca and under the Genamin® trademark from Clariant.

The amount of polyether blocks in these copolymers comprising polyamide blocks and polyether blocks is advantageously from 10 to 70% by weight of the copolymer, preferably from 35 to 60%.

The polyether diol blocks are either used as such and copolycondensed with polyamide blocks comprising carboxyl ends or they are aminated, to be converted to polyetherdiamines, and condensed with polyamide blocks comprising carboxyl ends. They can also be blended with polyamide precursors and a chain-limiting diacid to prepare polymers comprising polyamide blocks and polyether blocks having randomly distributed units.

The number-average molar mass $\overline{Mn}$ of the polyamide sequences is between 500 and 10 000 and preferably between 500 and 4 000, except for the polyamide blocks of the second type. The mass $\overline{Mn}$ of the polyether sequences is between 100 and 6 000 and preferably between 200 and 3 000.

These polymers comprising polymer blocks and polyether blocks, whether they originate from the copolycondensation of polyamide and polyether sequences prepared beforehand or from a one-stage reaction, exhibit, for example, an intrinsic viscosity of between 0.8 and 2.5, measured in meta-cresol at 250° C. for an initial concentration of 0.8 g/100 ml.

As regards their preparation, the copolymers of the invention can be prepared by any means which makes it possible to link together the polyamide blocks and the polyether blocks. In practice, use is made of essentially 2 processes, one known as a two-stage process and the other as a one-stage process. In the two-stage process, the polyamide blocks are first manufactured and then, in the second stage, the polyamide blocks and the polyether blocks are linked together. In the one-stage process, the polyamide precursors, the chain-limiting agent and the polyether are blended. A polymer is then obtained which essentially has polyether blocks, polyamide blocks of highly variable length but also the various reactants which have reacted randomly, which are distributed randomly (statistically) along the polymer chain. Whether this is a one- or two-stage process, it is advantageous to carry it out in the presence of a catalyst. Use may be made of a catalyst disclosed in U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920. In the one-stage process, polyamide blocks are also manufactured. This is why it was written at the beginning of this paragraph that the copolymers of the invention can be prepared by any means for linking together polyamide blocks and polyether blocks.

The preparation processes in which the polyamide blocks comprise carboxyl ends and the polyether is a polyetherdiol are now described in detail.

The two-stage process consists first in preparing the polyamide blocks comprising carboxyl ends by condensation of the polyamide precursors in the presence of a chain-limiting dicarboxylic acid and then, in a second stage, in adding the polyether and a catalyst. If the polyamide precursors are only lactams or $\alpha,\omega$-aminocarboxylic acids, a dicarboxylic acid is added. If the precursors already comprise a dicarboxylic acid, it is used in excess with respect to the stoichiometry of the diamines. The reaction is usually carried out between 180 and 300° C., preferably 200 to 260° C. The pressure in the reactor settles down between 5 and 30 bar and is maintained for approximately 2 hours. The pressure is slowly reduced in opening the reactor to the atmosphere and then the excess water is distilled off, for example in one hour or two.

With the polyamide comprising carboxylic acid ends having been prepared, the polyether and a catalyst are subsequently added. The polyether can be added in one or more steps and likewise for the catalyst. According to one advantageous form, the polyether is firstly added and the reaction of the OH ends of the polyether and of the COOH ends of the polyamide begins with the formation of ester bonds and the removal of water; as much water as possible is removed from the reaction mixture by distillation and then the catalyst is introduced in order to bring the bonding of the polyamide blocks and of the polyether blocks to completion. This second stage is carried out with stirring, preferably under a vacuum of at least 5 mm Hg (650 Pa), at a temperature such that the reactants and the copolymers obtained are in the molten state. By way of example, this temperature can be between 100 and 400° C. and generally 200 and 300° C. The reaction is monitored by measuring the torsional couple exerted by the molten polymer on the stirrer or by measuring the electrical power consumed by the stirrer. The end of the reaction is determined by the value of the couple or of the power which is targeted. The catalyst is defined as being any product which makes it possible to facilitate the bonding of the polyamide blocks and of the polyether blocks by esterification. The catalyst is advantageously a derivative of a metal (M) chosen from the group formed by titanium, zirconium and hafnium.

Mention may be made, as example of derivative, of the tetraalkoxides which correspond to the general formula $M(OR)_4$, in which M represents titanium, zirconium or hafnium and the R groups, which are identical or different, denote linear or branched alkyl radicals having from 1 to 24 carbon atoms.

The $C_1$ to $C_{24}$ alkyl radicals from which are chosen the R radicals of the tetraalkoxides used as catalysts in the process according to the invention are, for example, those such as methyl, ethyl, propyl, isopropyl, butyl, ethylhexyl, decyl, dodecyl or hexadodecyl. The preferred catalysts are the tetraalkoxides in which the R radicals, which are identical or different, are $C_1$ to $C_8$ alkyl radicals. Examples of such catalysts are in particular $Zr(OC_2H_5)_4$, $Zr(O-isoC_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$ or $Hf(O-isoC_3H_7)_4$.

The catalyst used in this process according to the invention can consist solely of one or more of the tetraalkoxides of formula $M(OR_4)$ defined above. It can also be formed by the combination of one or more of these tetraalkoxides with one or more alkali metal or alkaline earth metal alcoholates of formula $(R_1O)_pY$, in which $R_1$ denotes a hydrocarbon-comprising residue, advantageously a $C_1$ to $C_{24}$ and preferably $C_1$ to $C_8$ alkyl residue, Y represents an alkali metal or alkaline earth metal and p is the valency of Y. The amounts of alkali metal or alkaline earth metal alcoholate and of zirconium or hafnium tetraalkoxides which are combined in order to constitute the mixed catalyst can vary within wide limits. However, it is preferable to use amounts of alcoholate and of tetraalkoxides such that the molar proportion of alcoholate is substantially equal to the molar proportion of tetraalkoxide.

The proportion by weight of catalyst, that is to say of the tetraalkoxide or tetraalkoxides, when the catalyst does not include alkali metal or alkaline earth metal alcoholate, or else of the grouping of the tetraalkoxide or tetraalkoxides and of the alkali metal or alkaline earth metal alcoholate or alcoholates, when the catalyst is formed by the combination of these two types of compounds, advantageously varies from 0.01 to 5% of the weight of the blend of the dicarboxyl polyamide with the polyalkylene glycol and is preferably between 0.05 and 2% of this weight.

Mention may also be made, as examples of other derivatives, of the salts of the metal (M), in particular the salts of (M) and of an organic acid and the complex salts between the oxide of (M) and/or the hydroxide of (M) and an organic acid. The organic acid can advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts may be known as zirconyl salts. The Applicant without being bound by this explanation, believes that these salts of zirconium and of an organic acid or the complex salts mentioned above release $ZrO^{++}$ during the process. Use is made of the product sold under the name of zirconyl acetate. The amount to be used is the same as for the $M(OR)_4$ derivatives.

This process and these catalysts are disclosed in U.S. Pat. No. 4,332,920, U.S. Pat. No. 4,230,838, U.S. Pat. No. 4,331,786, U.S. Pat. No. 4,252,920, JP 07145368A, JP 06287547A and EP 613 919.

As regards the one-stage process, all the reactants used in the two-stage process are mixed, that is to say the polyamide precursors, the chain-limiting dicarboxylic acid, the polyether and the catalyst. It concerns the same reactants and the same catalyst as in the two-stage process described above. If the polyamide precursors are only lactams, it is advantageous to add a small amount of water.

The copolymer has essentially the same polyether blocks and the same polyamide blocks but also a small portion of the various reactants which have reacted randomly, which are distributed statistically along the polymer chain.

The reactor is closed and heated with stirring, as in the first stage of the two-stage process described above. The pressure settles down between 5 and 30 bar. When it no longer changes, the reactor is placed under reduced pressure while maintaining vigorous stirring of the molten reactants. The reaction is monitored as above for the two-stage process.

The catalyst used in the one-stage process is preferably a salt of the metal (M) and of an organic acid or a complex salt between the oxide of (M) and/or the hydroxide of (M) and an organic acid.

The preparation processes in which the polyamide blocks comprise carboxyl ends and the polyether is a polyetherdiamine are now described in detail.

The two-stage process consists first in preparing the polyamide blocks comprising carboxyl ends by condensation of the polyamide precursors in the presence of a chain-limiting dicarboxylic acid and then, in a second stage, in adding the polyether and optionally a catalyst. If the polyamide precursors are only lactams or α,ω-aminocarboxylic acids, a dicarboxylic acid is added. If the precursors already comprise a dicarboxylic acid, it is used in excess with respect to the stoichiometry of the diamines. The reaction is usually carried out at between 180 and 300° C., preferably 200 to 260° C. The pressure in the reactor settles down between 5 and 30 bar and is maintained for approximately 2 hours. The pressure is slowly reduced in opening the reactor to the atmosphere and then the excess water is distilled off, for example in one hour or two.

With the polyamide comprising carboxylic acid ends having been prepared, the polyether and optionally a catalyst are subsequently added. The polyether can be added in one or more steps and likewise for the catalyst. According to one advantageous form, the polyether is first added and the reaction of the NH$_2$ ends of the polyether and of the COOH ends of the polyamide begins with the formation of amide bonds and the removal of water; as much water as possible is removed from the reaction mixture by distillation and then the optional catalyst is introduced in order to bring the bonding of the polyamide blocks and of the polyether blocks to completion. This second stage is carried out with stirring, preferably under a vacuum of at least 5 mm Hg (650 Pa), at a temperature such that the reactants and the copolymers obtained are in the molten state. By way of example, this temperature can be between 100 and 400° C. and generally 200 and 300° C. The reaction is monitored by measuring the torsional couple exerted by the molten polymer on the stirrer or by measuring the electrical power consumed by the stirrer. The end of the reaction is determined by the value of the couple or of the power which is targeted. The catalyst is defined as being any product which makes it possible to facilitate the bonding of the polyamide blocks and of the polyether blocks. A person skilled in the art will prefer catalysis by protons.

As regards the one-stage process, all the reactants used in the two-stage process are blended, that is to say the polyamide precursors, the chain-limiting dicarboxylic acid, the polyether and the catalyst. It concerns the same reactants and the same catalyst as in the two-stage process described above. If the polyamide precursors are only lactams, it is advantageous to add a small amount of water.

The copolymer has essentially the same polyether blocks and the same polyamide blocks but also a small portion of the various reactants which have reacted randomly, which are distributed statistically along the polymer chain.

The reactor is closed and heated with stirring, as in the first stage of the two-stage process described above. The pressure settles down between 5 and 30 bar. When it no longer changes, the reactor is placed under reduced pressure while maintaining vigorous stirring of the molten reactants. The reaction is monitored as above for the two-stage process.

Mention may be made, as examples of copolymers (A), of the PEBAs sold under the Pebax® and Platamid® trademarks. A blend of copolymers (A) can be used.

As regards (B) and the ionic functional group, the ionic functional group,is intended to include all ions having measurable degree of ionization in water. The literature, e.g. Lange's Handbook of Chemistry or the Handbook of Chemistry and Physics provides tables of many ions, providing ionization constants as well. Thus, without limitation, examples include but are not limited to sulphonated diacids or diamines, preferably 2-sulphoisophthalic acid, 4-sulphoisophthalic acid, 5-sulphoisophthalic acid, 2-sulphoterephthalic acid, 2,6-dicarboxynaphtalene-4-sulphoric acid, 2.7-dicarboxynaphtalene-4-sulphonic acid and diphenylsulphoterephthalic acid.

The sulphonated diacid is advantageously chosen from sulphonates of dicarboxylic acids and preferably the alkali metal or ammonium salts of aromatic diacids. It relates, for example, to the sodium, potassium, lithium and ammonium salts of the acids and/or the alkyl esters of these carboxylic acids.

The sulphonate is advantageously chosen from the products of following formulae, which are respectively the salt of 5-sulphoisophthalic acid and the salt of 4-sulphoisophthalic acid:

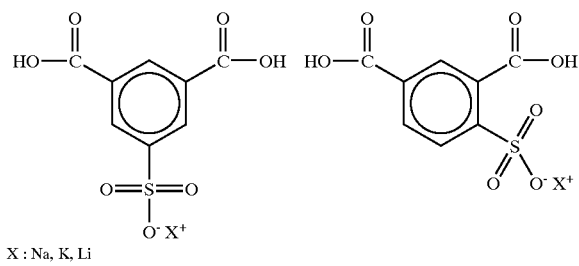

X : Na, K, Li

The ionic functional groups can be linked to the polymer chain at any position,for example in the middle or at the end of the chain. Thus, the expression "in its chain" is to be construed accordingly.

As regards the polyamides (B), these are the condensation products of at least one diacid comprising an ionic functional group with at least one diamine or of at least one diacid with a diamine comprising an ionic functional group. (B) can also comprise other units chosen from diacids, diamines and α,ω-aminocarboxylic acids or their optional corresponding lactams. The term "polyamide" denotes both polyamides and copolyamides. Within the strict meaning, a polyamide results from the condensation either of an α,ω-aminocarboxylic acid (or a lactam) or of a diamine and of a diacid. If several different diamines are condensed with one or more diacids, a copolyamide is obtained. Likewise, if the condensation is carried out of at least two different α-aminocarboxylic acids or of an α-aminocarboxylic acid with a diacid and a diamine. Examples of diacids, of diamines, of lactams and of α-aminocarboxylic acids were mentioned above. Advantageously, $\overline{Mn}$ is greater than 500 g/mol and preferably greater than 2000 g/mol.

Mention may be made, as examples of polyamides (B), of the condensation product of caprolactam and of SIPNa, the latter being used as chain-limiting agent for PA-6. Mention may also be made of the condensation product of caprolactam, of hexamethylenediamine, of adipic acid, of isophthalic acid and of SIPNa. The polyamide (B) can be prepared by the usual processes for the synthesis of polyamides. By way of example, use may be made of the first stage of the two-stage process for the synthesis of the copolymers (A) comprising polyamide blocks and polyether blocks by applying it to the monomers of the polyamide (B).

A blend of polyamides (B) can be used.

As regards the copolymers (B) comprising polyamide blocks and polyether blocks, they can be chosen from the same copolymers as the copolymers (A) but they comprise an ionic functional group in their chain. This functional group can be in the polyamide blocks and/or in the polyether blocks.

Three types of polyamide blocks can advantageously be used. According to a first type, the polyamide sequences (or blocks) originate, for example, from the condensation of an α,ω-aminocarboxylic acid or of the optional corresponding lactam in the presence of a sulphonated dicarboxylic acid as chain-limiting agent. According to an alternative form of this first type, the polyamide blocks originate from the condensation of at least one sulphonated dicarboxylic acid and of at least one diamine. It would not be departing from the scope of the invention if the polyamide block also comprised at least one dicarboxylic acid in addition to the sulphonated diacid.

According to a second type, the polyamide sequences result from the condensation of one or more α,ω-aminocarboxylic acids and/or of one or more lactams having from 6 to 12 carbon atoms in the presence of a sulphonated dicarboxylic acid as chain-limiting agent and are of low mass, that is to say with $\overline{Mn}$ of 400 g/mol to 800 g/mol. It would not be departing from the scope of the invention if the polyamide block also comprised at least one diamine and/or one dicarboxylic acid other than the sulphonated dicarboxylic acid.

According to a third type, the polyamide sequences result from the condensation of at least one α,ω-aminocarboxylic acid (or one lactam) with at least one diamine and at least one sulphonated dicarboxylic acid. It would not be departing from the scope of the invention if the polyamide block also comprised at least one dicarboxylic acid other than the sulphonated dicarboxylic acid.

According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms in the presence of a chain-limiting sulphonated dicarboxylic acid.

The polyether blocks of these copolymers (B) can be chosen from the same blocks as those of the copolymer (A). According to an alternative form, the polyether blocks are polyetherdiols and result from the linking of polyether blocks, for example the polyether blocks as described above, and of a dicarboxylic acid comprising an ionic functional group. The proportions are advantageously such that there is one more polyetherdiol block than functional dicarboxylic acid in order for the functional dicarboxylic acid to be inside the chain and for the chain thus to comprise OH endings.

A blend of copolymers (B) comprising polyamide blocks and polyether blocks can be used.

As regards the thermoplastic polyesters and polyesteramides (B) and first the polyesters, this term denotes polymers which are saturated condensation products of glycols, of at least one dicarboxylic acid comprising an ionic functional group, for example a sulphonated dicarboxylic acid, and optionally of other dicarboxylic acids (other than the sulphonated dicarboxylic acid) or of their derivatives. The polyester can comprise several of these other dicarboxylic acids. The other diacids are preferably aromatic dicarboxylic acids having from 8 to 14 carbon atoms and the glycol is chosen from the group consisting of neopentyl glycol, of cyclohexanedimethanol and of aliphatic glycols of formula $HO(CH_2)_nOH$ in which n is an integer ranging from 2 to 10. Up to 50 mol % of the aromatic dicarboxylic acid can be replaced by at least one other aromatic dicarboxylic acid having from 8 to 14 carbon atoms and/or up to 20 mol % can be replaced by an aliphatic dicarboxylic acid having from 2 to 12 carbon atoms.

Mention may be made, as examples of aromatic dicarboxylic acids, of terephthalic acid, isophthalic acid, dibenzoic acid, naphthalenedicarboxylic acid, 4,4'-diphenylenedicarboxylic acid, bis(p-carboxyphenyl)methane, ethylenebis(p-benzoic acid), 1,4-tetramethylenebis(p-oxybenzoic acid), ethylenebis(para-oxybenzoic acid) or 1,3-trimethylenebis(p-oxybenzoic acid). Mention may be made, as examples of glycols, of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexanedimethanol. The MFI of these polyesters, measured at 250° C. under 2.16 kg, can vary from 2 to 100 and advantageously from 10 to 80. "MFI" is the abbreviation of Melt Flow Index. As regards the polyesteramides, these are the preceding polyesters but additionally comprising diamines in their chain, such as, for example, hexamethylenediamine.

It is also possible to use a blend of different polyesters or different polyesteramides (B) or a blend of one or more polyesters with one or more polyesteramides.

As regards the copolymers (B) comprising the polyester blocks and polyether blocks, they are composed of flexible polyether blocks, which are the residues of polyetherdiols, and of rigid segments (polyester blocks), which result from the reaction of at least one dicarboxylic acid with at least one chain-extending short diol unit. The polyester blocks and the polyether blocks are connected via ester bonds resulting from the reaction of the acid functional groups of the acid with the OH functional groups of the polyetherdiol. The chain-extending short diol can be chosen from the glycols mentioned above in the description of the thermoplastic polyesters (B). These copolyetheresters are thermoplastic elastomers. According to a first form of the invention, the polyester blocks result from the reaction of a chain-extending short diol with at least one dicarboxylic acid comprising an ionic functional group, for example a sulphonated dicarboxylic acid, and optionally other dicarboxylic acids (other than the sulphonated dicarboxylic acid) or their derivatives. These other dicarboxylic acids were mentioned above in the description of the thermoplastic polyesters (B). The polyether blocks of these copolymers (B) can be chosen from the same polyether blocks as those of the copolymer (A). According to a second form of the invention, the polyether blocks of these copolymers (B) are polyetherdiols and result from the linking of polyether blocks, for example the polyether blocks of the copolymer (A) such as were described above, and of a dicarboxylic acid comprising an ionic functional group. The proportions are advantageously such that there is one polyetherdiol block more than functional dicarboxylic acid in order for the functional dicarboxylic acid to be inside the chain and for the chain thus to comprise OH endings.

A blend of several copolymers (B) comprising polyester blocks and polyether blocks can be used.

As regards the polyethers (B), these are advantageously polyetherdiols and they result from the linking of polyether blocks, for example the polyether blocks of the copolymer (A) such as were described above, and of a dicarboxylic acid comprising an ionic functional group. The proportions are advantageously such that there is one polyetherdiol block more than functional dicarboxylic acid in order for the functional dicarboxylic acid to be inside the chain and for the chain thus to comprise OH endings.

A blend of several polyethers (B) can be used.

As regards the polyurethanes (B), rigid polyurethanes and elastomeric polyurethanes can be distinguished. Rigid polyurethanes result from the reaction of at least one diisocyanate with at least one short diol. Elastomeric polyurethanes are composed of flexible polyether blocks, which are polyetherdiol residues, and of rigid blocks, which result from the reaction of at least one diisocyanate with at least one short diol. The chain-extending short diol can be chosen from the glycols mentioned above in the description of the thermoplastic polyesters (B). The polyetherdiols can be chosen from those mentioned as polyether blocks of (A). According to a first form of the invention, the short diol of the polyurethanes (B) results from the linking (i) of at least one diol chosen from the group consisting of neopentyl glycol, of cyclohexanedimethanol and of aliphatic glycols of formula $HO(CH_2)_nOH$ in which n is an integer ranging from 2 to 10 and (ii) of at least one dicarboxylic acid comprising an ionic functional group. The proportions are advantageously such that there is one diol more than functional dicarboxylic acid in order for the functional dicarboxylic acid to be inside the chain and for the short diol thus definitely to comprise OH endings. According to a second form of the invention, the polyether blocks of the polyurethanes (B) are polyetherdiols and result from the linking of polyether blocks, for example the polyether blocks of the copolymer (A) such as were described above, and of a dicarboxylic acid comprising an ionic functional group. The proportions are advantageously such that there is one polyetherdiol block more than functional dicarboxylic acid in order for the functional dicarboxylic acid to be inside the chain and for the chain thus to comprise OH endings.

A blend of several polyurethanes (B) can be used.

The antistatic effect increases with the proportion of polyether blocks in (A). It also increases with the proportion of ethylene oxide units in these polyether blocks. The antistatic effect increases with the amount of ionic functional groups present in (B). The proportions of (D) are advantageously from 95 to 85 parts for respectively 5 to 15 parts of (A)+(B). The proportion of (B) is advantageously from 1 to 99% by weight of (A)+(B) and preferably from 5 to 20%.

The compositions of the invention are manufactured by melt blending the various constituents (twin-screw, Buss® or single-screw extruders) according to the usual techniques for thermoplastics. The compositions can be granulated for the purpose of subsequent use (it is sufficient to remelt them) or else immediately injected into a mould or an extrusion or coextrusion device for manufacturing pipes, panels, films or profiles.

The compositions of the invention can comprise stabilizers, antioxidants, UV stabilizers or other additives.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

Copolymer A: Polyetheresteramide

EXAMPLE A1

Synthesis of a Polyetheresteramide PA 12-PEG1500

A blend of 105 parts of lactam-12, 17.1 parts of adipic acid, 0.3 parts of Irganox 1010 and 9 parts of water was placed in a 4 liter stainless steel autoclave, which was subsequently filled with nitrogen, replacing the air, followed by heating at 270° C. under pressure for 4 hours while stirring, to produce 122.1 parts of polyamide oligomer with carboxyl chain ends having a number-average molecular weight of 1 100 g/mol and an acid value of 110. The polyamide oligomer was subsequently blended with 175 parts of polyethylene glycol, having a number-average molecular weight of 1 500 g/mol, and 0.5 part of zirconium acetate, and the blend was heated at 245° C. to polymerize for 5 hours under a pressure reduced to less than 1 mmHg to produce a viscous polymer. The polymer was subsequently removed in the form of a strand, which was pelleted to produce the polyetheresteramide as copolymer A. The relative viscosity of the polymer obtained was 1.3, as measured for a 0.5% by weight solution in m-cresol at 25° C.

The resistivity obtained according to Example A1 is:

| | |
|---|---|
| Volume resistivity: ohm.cm | 8.8 E+09 |
| Surface resistivity: ohms/□ | 3.2 E+11 |

EXAMPLE A2

Synthesis of a Polyetheresteramide PA6-PEG1500

A blend of 105 parts of lactam-6, 17.1 parts of adipic acid, 0.3 parts of Irganox 1010 and 9 parts of water was placed in a 4 liter stainless steel autoclave, which was subsequently filled with nitrogen, replacing the air, followed by heating at 250° C. under pressure for 4 hours while stirring, to produce 122.1 parts of polyamide oligomer with carboxyl chain ends having a number-average molecular weight of 1 100 g/mol and an acid value of 110. The polyamide oligomer was subsequently blended with 175 parts of polyethylene glycol, having a number-average molecular weight of 1 500 g/mol, and 0.5 part of zirconium acetate, and the blend was heated at 245° C. to polymerize for 5 hours under a pressure reduced to less than 1 mmHg to produce a viscous polymer. The polymer was subsequently removed in the form of a strand, which was pelleted to produce the polyetheresteramide as copolymer A. The relative viscosity of the polymer obtained was 1.3, as measured for a 0.5% by weight solution in m-cresol at 25° C.

The resistivity obtained according to Example A2 is:

| Volume resistivity: ohm.cm | 8.9 E+09 |
|---|---|
| Surface resistivity: ohms/□ | 6.3 E+10 |

EXAMPLE A3

Synthesis of a Polyetheresteramide PA6-PEG/ bisphenol A 2000 (Patent EP 0 613 919)

A blend of 105 parts of lactam-6, 17.1 parts of adipic acid, 0.3 parts of Irganox 1010 and 7 parts of water was placed in a 4 liter stainless steel autoclave, which was subsequently filled with nitrogen, replacing the air, followed by heating at 220° C. under pressure for 4 hours while stirring, to produce 117 parts of polyamide oligomer with carboxyl chain ends having a number-average molecular weight of 1 100 g/mol and an acid value of 110. The polyamide oligomer was subsequently blended with 225 parts of the addition product of ethylenel oxide with bisphenol A, having a number-average molecular weight of 2 000 g/mol, and 0.5 part of zirconium acetate, and the blend was heated at 245° C. to polymerize for 5 hours under a pressure reduced to less than 1 mmHg to produce a viscous polymer. The polymer was subsequently removed in the form of a strand, which was pelleted to produce the polyetheresteramide as copolymer A. The relative viscosity of the polymer obtained was 1.2, as measured for a 0.5% by weight solution in m-cresol at 25° C.

EXAMPLE A3

| Volume resistivity: ohm.cm | 5 E+8 |
|---|---|
| Surface resistivity: ohms/□ | 1 E+9 |

EXAMPLE A4

Polyetheresteramide comprising PA-6 blocks with $\overline{Mn}$ of 1 500 and PEG blocks with $\overline{Mn}$ of 1 500, with an intrinsic viscosity of 1.2 to 1.25 and a Shore D hardness of 42, prepared according to the process disclosed in U.S. Pat. No. 4,252,920.

EXAMPLE A4

| Volume resistivity: ohm.cm | 8.8 E+9 |
|---|---|
| Surface resistivity: ohms/□ | 3.2 E+11 |

Polymer (B)

EXAMPLE B1

Synthesis According to Example 1 of Patent WO 0071603

The synthesis is carried out in a reactor with a capacity of 4 liters with three necks: a gas inlet, a connection to a distillation system comprising a condenser connected to a distillate receiver, and an anchor stirrer.

The following are introduced into this reactor: 339.0 g of lactam-6, 196.2 g of salt of adipic acid and of hexamethylenediamine, 187.34 g of hexamethylenediamine, 168.5 g of isophthalic acid, 161.0 g of mono[lacuna] salt of 5-sulphoisophthalic acid (0.60 mol), 22.5 g of cinnamic acid and 50 g of water.

The reactor is purged with nitrogen and then heated over 1 hour with all valves closed to a bulk temperature of 200° C. The pressure is then 6 bar. At this point, the stirring is begun and the bulk temperature is raised over 1 hour to 240° C. for 4 hours. The pressure reached at the end of the stationary 4 hours is 18 bar and has stabilized, which means, first, that all the monomers have reacted and, secondly, that the equilibrium for formation of the amides has been reached. The reduction in pressure is begun at this point (for 90 minutes) and the bulk temperature at the end of the reduction in pressure is 270° C. A 30 l/h stream of nitrogen is passed for 15 minutes and the copolymer is removed from the reactor and collected in a cooled tray or on a cooled belt to ensure rapid solidification.

The product obtained is slightly yellow, friable and odourless. The Tg is 89° C. (measured by DSC: 10° K/min).

EXAMPLE B2

Synthesis According to Example 2 of Patent WO 0071603

The procedure corresponds to that of Example B1, except that 13.07 g of crotonic acid are charged instead of the cinnamic acid.

The product obtained is slightly yellow, friable and odourless. The Tg is 83° C. (measured by DSC: 10° K/min).

EXAMPLE B3

The procedure corresponds to that of Example B1, except that 13.07 g of undecenylic acid are charged instead of the cinnamic acid.

The product obtained is colourless, friable and odourless. The Tg is 90° C. (measured by DSC: 10° K/min).

EXAMPLE B4

Copolymer Comprising Polyamide Blocks and Polyether Blocks

The synthesis is carried out in a reactor with a capacity of 4 liters with three necks: a gas inlet, a connection to a distillation system comprising a condenser connected to a distillate receiver, and an anchor stirrer.

The following are introduced into this reactor: 42.6 parts of lactam-6, 22.3 parts of salt of adipic acid and of hexamethylenediamine, 12.7 parts of hexamethylenediamine, 17.1 parts of isophthalic acid, 5.05 parts of mono[lacuna] salt of 5-sulphoisophthalic acid and 4 parts of demineralized water.

The reactor is purged with nitrogen and then heated, with all valves closed, to a bulk temperature of 260° C. over 100 minutes. The reactor is under stationary conditions for 2 hours at a pressure of 18 bar. The reduction in pressure is begun at the end of the stationary phase (for 90 minutes) and the bulk temperature of the end of the reduction in pressure is 250° C. A stream of nitrogen is passed for 45 minutes. In this first stage, the target is a mass Mn of 7 000 g/mol of 94 parts of a diacid-limited oligomer. Subsequently, 9.53 parts of polyethylene glycol with a number-average molecular weight of 600 g/mol are added to the same autoclave at 250° C. The reactor continues to be flushed with nitrogen for 80 minutes at 260° C. Subsequently, the reactor is placed under vacuum up to 10 mbar over 70 minutes. 0.5 parts of zirconium tetrabutoxide is introduced. After 40 min, the reactor is pressurized and the polymer is removed from the reactor and collected on a cooled belt to ensure rapid solidification.

The product obtained is slightly yellow and odourless. The Tg is 52° C. (measured by DSC: 10° K/min).

EXAMPLE B5

PA-6 with Chain-limiting Agent SIPNa

A blend of 993 parts of lactam-6, 225 parts of mono [lacuna] salt of 5-sulphoisophthalic acid and 96 parts of water was placed in a 4 liter stainless steel autoclave which was subsequently filled with nitrogen, replacing the air, followed by heating at 270° C. under pressure for 4 hours while stirring to produce 1 118 parts of polyamide oligomer with carboxyl chain ends having a number-average molecular weight of 1 450 g/mol. Subsequently, the pressure was reduced to atmospheric pressure in order to remove a colourless and friable product from the autoclave.

EXAMPLE B6

Polyester with SIPNa Group, Sold by Eastman Under the Reference AQ 55S

Blend C=A+B:

The copolymer A can thus be blended with the product B, A+B=C, according to any one of the examples of the invention, to be used in a thermoplastic matrix in order to render the resin antistatic.

|  | Unit | Control | Ex. C1 | Ex. C2 |
|---|---|---|---|---|
| A4 | Mass % | 100 | 80 | 80 |
| B4 | Mass % |  | 20 |  |
| B2 | Mass % |  |  | 20 |
| Surface resistivity | ohms/□ | 3.2 E+11 | 8.70 E+09 | 3.10 E+09 |
| Volume resistivity | ohms.cm | 8.8 E+09 | 3.5 E+08 | 1.30 E+08 |

The above table clearly shows that the addition of the compounds B2 or B4 makes possible an improvement in the antistatic effects of the compound A4.

In the example which follows, the thermoplastic resin (D) is a PS, the characteristics of which are as follows:
PS: it is a styrene-butadiene copolymer. This copolymer is characterized by a flow index at 200° C. under 5 kg of between 3 and 5 g/10 min (ISO Standard 1133:91). It is also characterized by a Vicat temperature of 97° C. (ISO Standard 306A50) and an Izod impact strength (ISO Standard 180/1A) of 10 kJ/m$^2$. It is sold by Atofina under the reference LACQRENE® 4241.

The compositions of the invention are prepared by the usual techniques for blending thermoplastics, such as, for example, single-screw or twin-screw extrusion or else using a device of the Buss® Ko-kneader type. The following table, in which the proportions are by weight, clearly shows the effect of the addition of the products A and B on the antistatic performance of the final product.

The preceding examples can be repeated with similar success by substituting the generically or specifically described reactants and/or operating conditions of this invention for those used in the preceding examples.

The entire disclosures of all applications, patents and publications, cited above or below, and of corresponding French application No. 01/05.914, filed May 3, 2001, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

|  | Ex 1 | Ex 2 | Ex 3 | Ex 4 | Ex 5 | Ex 6 | Ex 7 |
|---|---|---|---|---|---|---|---|
| PS |  |  | 100 | 90 | 90 | 90 | 90 |
| A1 | 100 | 90 |  | 10 |  |  |  |
| A4 |  |  |  |  | 10 |  | 8 |
| B5 |  | 10 |  |  |  |  |  |
| B6 |  |  |  |  |  |  | 2 |
| C1 = 90A1 + 10B5 |  |  |  |  |  | 10 |  |
| Volume resistivity ohm.cm | 8.8 E+09 | 2.5 E+09 | 1.4 E+17 | 4 E+14 | 2.7 E+13 | 1.4 E+13 | 7.9 E+11 |
| Surface resistivity ohm/□ | 3.2 E+11 | 1.6 E+10 | 2.9 E+14 | 2 E+12 | 1.4 E+12 | 1.2 E+11 | 8.5 E+9 |

What is claimed is:

1. A composition comprising, per 100 parts by weight:
   95 to 85 parts of a thermoplastic polymer (D),
   5 to 15 parts of (A)+(B)
   wherein
   (A) is a copolymer comprising polyamide blocks and polyether blocks, wherein the polyamide blocks and polyether blocks of copolymer (A) do not contain at least one ionic functional group,
   (B) is a polymer or an oligomer which comprises, in its chain, at least one ionic functional group and is selected from the group consisting of:
   polyamides,
   copolymers comprising polyamide blocks and polyether blocks,
   thermoplastic polyesters or polyesteramides,
   copolymers comprising polyester blocks and polyether blocks,
   polyethers, and
   polyurethanes, and
   (D) is selected from the group consisting of polyolefins, polyamides, fluoropolymers, saturated polyesters, polycarbonate, styrene resins, polymethylmethacrylate, thermoplastic polyurethanes, copolymers comprising polyamide blocks, copolymers comprising polyester blocks and polyether blocks, polyvinylchloride, copolymers of ethylene and of vinyl alcohol and polyketones, and
   wherein polymer (D), copolymer (A) and polymer (B) are not the same.

2. A composition according to claim 1, in which the polyether blocks of (A) are PEG blocks or blocks obtained by oxyethylation of bisphenols.

3. A composition according to claim 1, in which the polyether blocks of (A) are composed of ethoxylated primary amines.

4. A composition according to claim 1, in which the ionic functional group is chosen from the sulphonates of aromatic dicarboxylic acids.

5. A composition according to claim , in which the ionic functional group is chosen from alkali metal or ammonium salts.

6. A composition according to claim 1, in which the polyamide (B) has a molar mass Mn greater than 500 g/mol.

7. A composition according to claim 1, wherein (B) comprises a copolymer of polyamide blocks and polyether blocks wherein the polyamide blocks are produced from condensation of an α,ω-aminocarboxylic acid or optionally of the corresponding lactam in the presence of a sulphonated dicarboxylic acid as chain-limiting agent.

8. A composition according to claim 1, wherein (B) comprises a copolymer of polyamide blocks and polyether blocks wherein the polyamide blocks are produced from condensation of at least one sulphonated dicarboxylic acid and of at least one diamine.

9. A composition according to claim 1, wherein (B) comprises a copolymer of polyamide blocks and polyether blocks wherein the polyamide blocks are produced from condensation of one or more α,ω-aminocarboxylic acids and/or of one or more lactams having from 6 to 12 carbon atoms in the presence of a sulphonated dicarboxylic acid as chain-limiting agent and have a mass Mn of between 400 and 800 g/mol.

10. A composition according to claim 1, wherein (B) comprises a copolymer of polyamide blocks and polyether blocks wherein the polyamide blocks are produced from condensation of at least one α,ω-aminocarboxylic acid (or one lactam), at least one diamine and at least one sulphonated dicarboxylic acid.

11. A composition according to claim 1, wherein (B) comprises a copolymer of polyamide blocks and polyether blocks wherein the polyamide blocks are produced from condensation of at least two α,ω-aminocarboxylic acids or of at least two lactams having from 6 to 12 carbon atoms or of a lactam and of an aminocarboxylic acid which does not have the same number of carbon atoms in the presence of a chain-limiting sulphonated dicarboxylic acid.

12. A composition according to claim 1, wherein (B) comprises a copolymer of polyamide blocks and polyether blocks wherein the polyether blocks comprise polyetherdiols and result from the linking of polyether blocks and of a sulphonated dicarboxylic acid.

13. A composition according to claim 1, wherein (B) comprises thermoplastic polyesters which are saturated condensation products of glycols, of at least one sulphonated dicarboxylic acid and optionally of other dicarboxylic acids (other than the sulphonated dicarboxylic acid) or of their derivatives.

14. A composition according to claim 1, wherein (B) comprises the thermoplastic polyesteramides which are saturated condensation products of glycols, of at least one sulphonated dicarboxylic acid, of at least one diamine and optionally of other dicarboxylic acids (other than the sulphonated dicarboxylic acid) or of their derivatives.

15. A composition according to claim 1, wherein (B) comprises a copolymer of polyester blocks and polyether blocks wherein the polyester blocks result from the reaction of a chain-extending short diol with at least one sulphonated dicarboxylic acid and optionally other dicarboxylic acids (other than the sulphonated dicarboxylic acid) or their derivatives.

16. A composition according to claim 1, wherein (B) comprises a copolymer of polyester blocks and polyether blocks wherein the polyether blocks comprise polyetherdiols and result from the linking of polyether blocks and of a sulphonated dicarboxylic acid.

17. A composition according to claim 1, wherein (B) comprises polyethers which comprise polyetherdiols and result from the linking of polyether blocks and of a sulphonated dicarboxylic acid.

18. A composition according to claim 1, wherein (B) comprises polyethers of the polyurethanes, said polyethers comprising polyetherdiols and result from the linking of polyether blocks and of a dicarboxylic acid comprising an ionic functional group.

19. A composition according to claim 1, wherein (B) comprises polyurethanes which result from the reaction of at least one diisocyanate with a short diol, said short diol resulting from the linking (i) of at least one diol chosen from the group consisting of neopentyl glycol, of cyclohexanedimethanol and of aliphatic glycols of formula HO(CH2)$_n$OH in which n is an integer ranging from 2 to 10 and (ii) of at least one dicarboxylic acid comprising an ionic functional group.

20. A composition according to claim 1, in which the proportion of (B) is from 1 to 99% by weight of (A)+(B).

21. A composition according to claim 1, in which the proportion of (B) is from 5 to 20% by weight of (A)+(B).

22. A composition as claimed in claim 1, wherein the polyamide blocks of the copolymer of component (A) are prepared by a process comprising condensation of aminocarboxylic, lactams, or dicarboxylic acids with diamines.

23. A composition as claimed in claim 22, wherein the polyamide blocks of the copolymer of component (A) are of polyamide-12 or polyamide-6.

24. A composition according to claim 22, wherein the polyether blocks of the copolymer of component (A) are composed of ethylene oxide units.

25. A composition according to claim 24, wherein the polyether blocks of the copolymer of component (A) represents 5–85% by weight of the copolymer.

26. A composition according to claim 25, wherein a polymer of component (B) copolymer comprises polyamide blocks and polyether blocks.

27. A composition according to claim 24, wherein a polymer of component (B) copolymer comprises polyamide blocks and polyether blocks.

28. A composition according to claim 22, wherein a polymer of component (B) copolymer comprises polyamide blocks and polyether blocks.

29. A composition according to claim 1, wherein the polyether blocks of the copolymer of component (A) represents 5–85% by weight of the copolymer.

30. A composition according to claim 1, wherein the polyether blocks of the copolymer of component (A) are composed of ethylene oxide units.

31. A composition according to claim 1, wherein the polyamide blocks of the copolymer (A) of a number-average molar mass of 500–10,000.

32. A composition according to claim 1, wherein the polyamide blocks of the copolymer (A) of a number-average molar mass of 500–4,000.

33. A composition according to claim 1, wherein a polymer of component (B) copolymer comprises polyamide blocks and polyether blocks.

34. An article of manufacture made from a composition according to claim 1, wherein said article is pipe, panel, film or profile.

35. An article according to claim 34, wherein said article is pipe, panel, or film.

36. A composition comprising, per 100 parts by weight:
99 to 60 parts of a thermoplastic polymer (D),
1 to 40 parts of (A)+(B)
wherein
(A) is a copolymer comprising polyamide blocks and polyether blocks, wherein the polyamide blocks and polyether blocks of copolymer (A) do not contain at least one ionic functional group,
(B) is a polymer or an oligomer which comprises, in its chain, at least one ionic functional group and is selected from the group consisting of:

polyamides,
copolymers comprising polyamide blocks and polyether blocks,
thermoplastic polyesters or polyesteramides,
copolymers comprising polyester blocks and polyether blocks,
polyethers, and
polyurethanes, and
wherein polymer (D), copolymer (A) and polymer (B) are not the same.

* * * * *

UNITED STATES PATENT AND TRADEMARK OFFICE
CERTIFICATE OF CORRECTION

PATENT NO. : 6,913,804 B2
DATED : July 5, 2005
INVENTOR(S) : Philippe Blondel

It is certified that error appears in the above-identified patent and that said Letters Patent is hereby corrected as shown below:

Column 18,
Line 62, after "claim", insert -- 4 --.

Column 20,
Line 9, delete "(CH2)" and insert -- $(CH_2)$ --.
Line 11, delete hyphen.
Line 19, delete "aminocarboxylic" and insert -- α,ω-aminocarboxylic --.
Lines 44 and 47, change "of" to -- have --.

Signed and Sealed this

Twenty-second Day of November, 2005

JON W. DUDAS
*Director of the United States Patent and Trademark Office*